United States Patent
Fiet

[15] 3,657,630
[45] Apr. 18, 1972

[54] ELECTRO SERVOSYSTEM FOR A FORCE BALANCING GAUGE

[72] Inventor: Owen O. Fiet, Redondo Beach, Calif.
[73] Assignee: TRW Inc., Redondo Beach, Calif.
[22] Filed: Oct. 9, 1968
[21] Appl. No.: 766,261

[52] U.S. Cl. ..........................318/676, 318/687, 318/662, 73/398 C
[51] Int. Cl. ...........................................G05b 11/01
[58] Field of Search...............73/398 C; 324/61 F, 61 BC; 318/687, 676, 662

[56] References Cited

UNITED STATES PATENTS

| | | | |
|---|---|---|---|
| 2,476,496 | 7/1949 | Kliever | 318/20.740 |
| 2,606,310 | 8/1952 | Baker | 318/20.740 |
| 2,706,799 | 4/1955 | Howe et al. | 318/22 |
| 2,734,736 | 2/1956 | Payne | 318/32 X |
| 2,849,669 | 7/1958 | Kinkel | 318/32 |
| 3,041,512 | 6/1962 | Zeigler et al. | 318/22 |
| 3,079,792 | 3/1963 | Hubbs | 318/22 X |
| 3,080,513 | 3/1963 | Edwards | 318/20.740 |
| 3,085,194 | 4/1963 | Revesz | 318/20.740 X |
| 3,457,481 | 7/1969 | Riley | 318/22 X |

*Primary Examiner*—T. E. Lynch
*Attorney*—Daniel T. Anderson, William B. Leach and Donald W. Graves

[57] ABSTRACT

A very sensitive servosystem is provided for use with measuring instruments or gauges of the type wherein the force to be measured is counterbalanced by an identical force which tends to maintain the force sensing element in a null position. The restoring force may be current sensitive. Deviations from the null position are represented as an output of an alternating current bridge circuit. The bridge output is utilized in feedback circuit to control a current supplied to the gauge restoring force device. High resolution is accomplished by means of an amplified bridge output, a narrow band filter, and a phase-lock loop circuit. When used in association with a pressure gauge of the type described, the force and counter force are per unit area of sensing element.

The pressure gauge disclosed herein is disclosed and claimed in copending application Ser. Number 766,261, filed concurrently herewith and assigned to the assignee of the present application.

2 Claims, 5 Drawing Figures

PATENTED APR 18 1972 3,657,630

Owen O. Fiet
INVENTOR.

BY William B. Leach
ATTORNEY

Owen O. Fiet
INVENTOR.

BY William B. Leach

ATTORNEY

ELECTRO SERVOSYSTEM FOR A FORCE BALANCING GAUGE

BACKGROUND OF THE INVENTION

The field of art to which the invention pertains is closed loop null seeking servo circuitry for gauges or transducers of the type having a return to null mechanical system which measures fluid pressure, temperature, acceleration and the like.

Present electromechanical transducer servosystem generally operate in an open loop condition. This prohibits the use of a null seeking transducer and, therefore, errors in measurement due to transducer element elastic stresses, mechanical hysteresis and the like are introduced into the measurement. In those circuits utilizing closed loop servo methods, the sensor exciting carrier is usually of a wideband type and any sensing system must necessarily have inherent error due to system noise. When minute changes in physical phenomena, such as fluid pressure in the region of $10^{-12}$ millimeters of mercury, is to be measured, the aggregate of the noise over all frequencies may effectively swamp the signal desired to be measured.

It is accordingly an object of the present invention to provide an electric servosystem compatible with transducers of the type having a return to null mechanical force sensing system.

Another object of the present invention is to provide an electric servosystem compatible with a pressure transducer as described herein and which will provide pressure measurements in the order of $10^{-12}$ mmhg (millimeters of mercury).

SUMMARY OF THE INVENTION

A precision electric servosystem in accordance with the present invention permits precise measurements of force when used in conjunction with a force balancing type gauge. The gauge further includes a displaceable or deformable force sensing member such as a thin metal diaphragm for exposure to fluid pressure, a position sensing element for determining deviations from a null position such as variations in diaphragm position, and means for restoring the force sensing member toward its null position such as a current conducting diaphragm in a tangential magnetic field.

The servosystem comprises a position detecting means such as an alternating current bridge circuit having capacitive elements formed by the gauge diaphragm and a capacitive electrode in the gauge. Further, a generator is coupled to the gauge restoring means and may comprise a variable current source supplying current to the gauge diaphragm. Means couple the output of the condition detecting means to the generator such as the bridge output to the generator to vary the current to the gauge diaphragm.

In order to minimize the forces on the gauge diaphragm, a high gain amplifier is provided to amplify the bridge output. Thus, a very small diaphragm deflection produces a large amplifier output signal for controlling the restoring current to the diaphragm. Precision measurements are further enhanced by provision of a narrow band filter at the bridge output and by a phase-lock loop to maintain a proper bridge circuit operating frequency.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
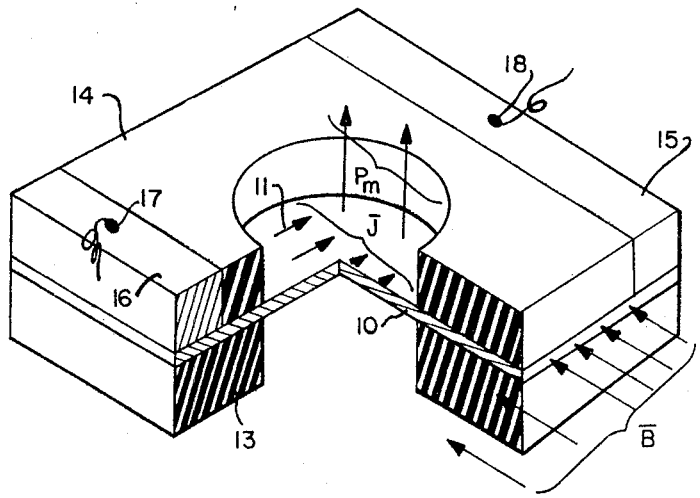
FIG. 1 is a perspective view of a pressure sensing instrument or gauge which may be used in conjunction with the present invention.

Referring to the drawings, wherein like elements are designated by like reference characters in the several views, there is illustrated a force balancing type instrument for measuring a differential fluid pressure. The fluid to be measured may be a gas or liquid. The reference pressure medium may be a like or differing fluid.

The differential fluid pressure is applied to a displaceable force sensing member, e.g., to opposing faces of a diaphragm. Deviations of the diaphragm from a null position are sensed. An electromechanical servosystem controls an electromagnetic force acting upon the diaphragm so as to return the diaphragm to its null position. The electromagnetic force is therefore an exact point function analog of the differential pressure.

In FIG. 1 there is shown a diaphragm assembly. Since a static fluid pressure is exerted normal to and uniformly over a solid boundary, it follows that the electromagnetic force, to be an exact replica of the fluid force, must also be normal to and uniformly distributed over the sensing diaphragm. To this end, diaphragm 10 is clamped between a lower mounting block 13 and an upper mounting block 14. Blocks 13, 14 have aligned apertures which expose a central circular portion of diaphragm 10. This central portion or unclamped portion 11' of diaphragm 10 serves as the active or sensing portion. The differential fluid pressure is directed to the opposing unclamped portions 11 of diaphragm 10.

Mounting blocks 13, 14 are of insulating material. As is clear in FIG. 1, block 14 is somewhat narrower than block 13. This accommodates the placement of end bars 15, 16 along opposing edge portions of diaphragm 10. End bars 15, 16 are of current conducting material.

As has been stated, the static fluid pressure exerted upon the unclamped portion 11 of diaphragm 10 will be a force normal to portion 11 and uniformly distributed thereover, An identical opposing uniform electromagnetic force may be created on unclamped portion 11. The conditions required for uniform normal electromagnetic pressure $P_M$ are a uniform current density $\bar{J}$ and constant and uniform transverse tangential magnetic flux $\bar{B}$ at the unclamped surfaces 11 of diaphragm 10.

Uniform current density $\bar{J}$ is readily attained by attaching full width conducting bars 15, 16 on the rectangular diaphragm. A current of uniform density will be conducted by diaphragm 10 provided diaphragm 10 is rectangular, and has uniform electrical conductivity, thickness and width. A uniform transverse tangential magnetic field may be readily supplied by a properly designed permanent magnet or electromagnet.

When the magnetic field $\bar{B}$ is constant, the electromagnetic force is directly proportion to the current through the diaphragm and is an effective means for controlling the displacement of the diaphragm. If a differential pressure displaces the diaphragm from its null position, a servosystem may be used to direct a larger current in the diaphragm, thus more electromagnetic pressure is created and the diaphragm is returned to the null position. The current is therefore an exact measure of the differential pressure.

Figure 2:
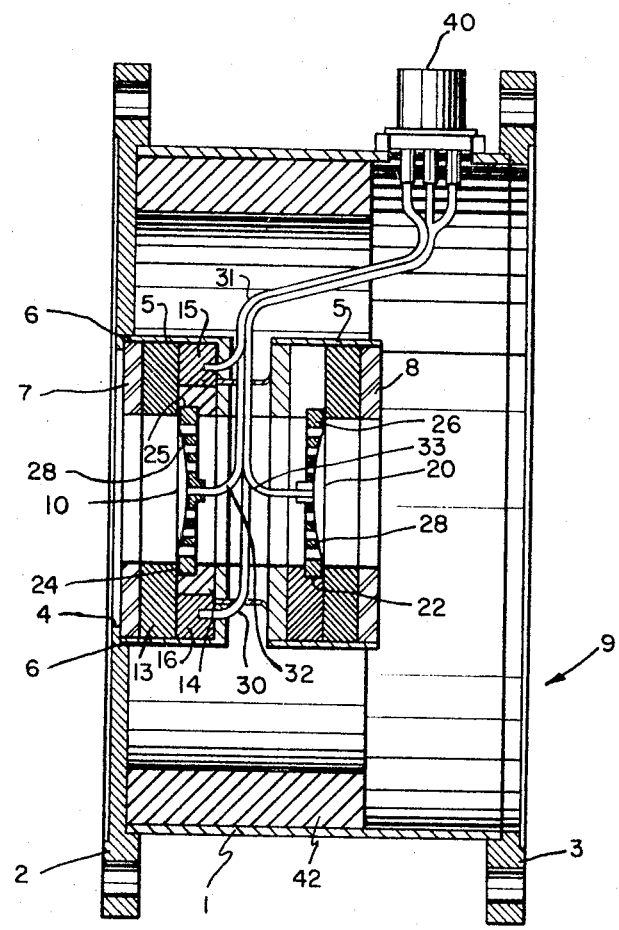
FIG. 2 is an elevational view in cross section of the pressure sensing apparatus of FIG. 1 in association with an instrument housing.
Figure 3:
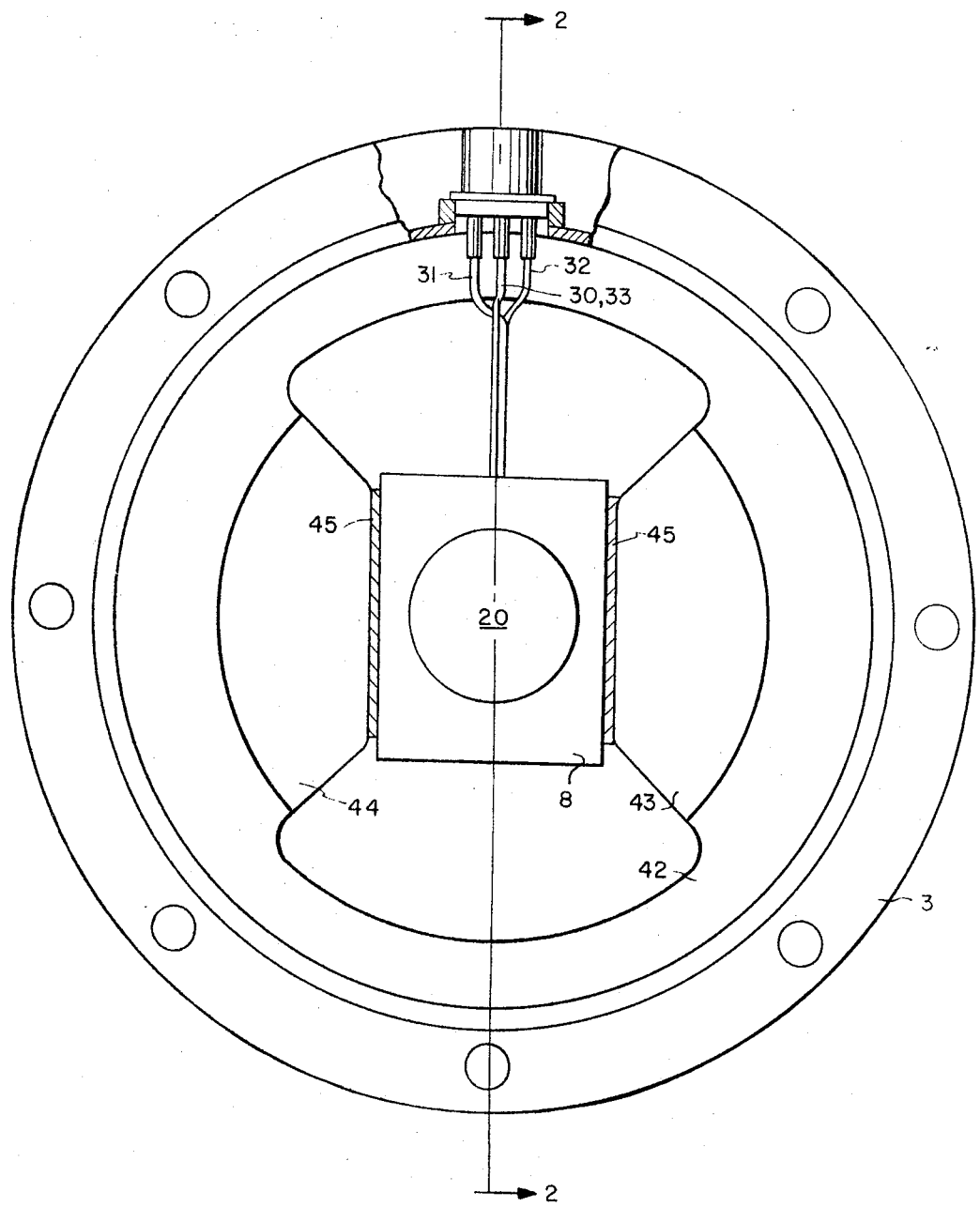
FIG. 3 is an end view of the pressure sensing instrument of FIG. 2.

Turning now to FIGS. 2 and 3, there is shown a precision pressure sensing instrument, generally designated, incorporating the diaphragm assembly of FIG. 1. A second diaphragm or reference diaphragm 20 is included to obtain direct electrical compensation for errors due to the effect of factors such as vibration, change in gas species, sorption, permeation and temperature. Capacitance electrodes 22, 24 are provided to ascertain deviations of the diaphragms from a null position. The electrical capacity of pressure diaphragm 10 is compared to the electrical capacity of reference diaphragm 20. The capacity differential is proportional to the applied differential fluid pressure. Any deviation of the diaphragm common to each are effectively cancelled.

The capacity differential is produced as an electrical output of a bridge circuit. This output is amplified and the output, being proportional to the fluid pressure differential, is used for negative feedback to control the pressure diaphragm current. The diaphragm is thus restored to its null position.

As has been stated, the electrodes 24, 26 each cooperate with diaphragms 10, 20, respectively, to measure the capacitive differential of the two diaphragms. As explained above, these elements form a portion of an AC bridge circuit. It is appreciated that other types of position sensors may be used. In order to maintain the precision characteristics of the instrument, the position sensor must not create friction, must have minimal force loading on the diaphragm, and be independent of the pressure being sensed. For example, an inductance sensor is very usable for the reason that it does not create any strong electrical forces on the diaphragm. Similarly, a mirrored surface on the pressure sensing diaphragm enables the use of photo optics techniques. Also, an optical flat placed on or near the surface of the sensor diaphragm lends to interferometric measurements. Extremely precise measurements may thus be made. Variations of the diaphragm within a half wave length of light may be sensed. Interferometry, however, requires highly precise diaphragm surfaces.

As shown in FIGS. 2 and 3, the instrument includes a cylindrical housing 1, having flanges 2 and 3. Flange 2 extends inwardly over the housing 1 to form a circular aperture 4 through which the fluid whose pressure is to be measured is admitted. Frame member 5 is provided for holding two diaphragm assemblies as shown in FIG. 1. Frame member 5 is fixed to flange 2 as at 6, which may be welded joint. Retainer plates 7 and 8 serve to hold the diaphragm assemblies within frame member 5.

The pressure sensing diaphragm assembly is similar to that of FIG. 1. As shown in FIG. 2, diaphragm 10 is clamped between a lower mounting block 13 and an upper mounting block 14. Electrically conducting end bars 15, 16 serve to distribute current to diaphragm 10.

A pressure electrode 24 is mounted on shoulder 25 of upper mounting block 14. A reference electrode 26 of similar construction is provided adjacent reference diaphragm 20. Each electrode 24, 26 further serves as a stop plate or seat to restrain its associated diaphragm from excessive deflection. The surface of the electrode facing its associated diaphragm is shaped to coincide with the normal elastic curve of the diaphragm at a desired limit of deflection. In order to eliminate mechanical clamping and electrode shorting, a low friction insulating coating 28, such as polytetrafluoroethylene, is applied to the face of each electrode 24, 26.

Electrical conductors 30, 31 for diaphragm current and electrode conductors 32, 33 are terminated in a standard pressure tight electrical connector 40 for ready connection to the external electromechanical servosystem circuitry. The pressure to be measured is admitted through aperture 4 in housing flange 2 and to one surface of diaphragm 10 through the apertures in retainer plate 7 and lower mounting block 13. Reference fluid is admitted to the housing interior where it acts upon both surfaces of the reference diaphragm 20 and upon the other face of pressure diaphragm 10.

Other features of the precision pressure sensing instrument include a cylindrical yoke magnet 42. Magnet 42 has integrally formed inwardly facing poles 43, 44 which direct magnetic lines of flux tangentially across the diaphragms 10, 20. The pole faces are positioned closely adjacent the edges of diaphragms 10, 20 to insure a strong magnetic field. The faces are electrically insulated from diaphragms 10, 20 by a thin coating of high temperature insulation varnish 45.

The operation of the pressure sensing instrument will now be explained with reference to the electric servosystem shown in FIG. 4.

The pressure sensing instrument 9 is shown within the dashed lines. One face of pressure diaphragm 10 is exposed to the fluid whose pressure is to be measured. The other face of diaphragm 10 and each face of diaphragm 20 are exposed to a reference pressure. A control current may be directed through diaphragm 10 via conductors 30 and 31. Pressure electrode 24 capacitively cooperates with diaphragm 10 to determine the position of diaphragm 10. Reference electrode 26 cooperates with diaphragm 20 to determine its position. Since both diaphragms will be subject to common disturbances not originating from a fluid pressure change, all such external disturbances will be electrically cancelled. The capacitive differential of the two diaphragms is used as an electrical output of a capacitive measuring AC (alternating current) bridge circuit. The bridge in conjunction with the diaphragm and electrodes of the gauge serves to detect the position of the gauge diaphragm or force sensing member. The bridge circuit includes the electrodes 24, 26, inductive coils $L_1$ and $L_2$, and transformer coil $L_0$.

The output of the bridge circuit is a first signal which is representative of the instantaneous condition of the force sensing member in the gauge. The output of the bridge circuit is coupled to the input of a narrow band filter 55. This filter aids in decreasing the system noise power as reflected by the formula $P_n \approx A \Delta f$. It will be appreciated that a narrow band of frequencies will tend to minimize the total noise power. If the system noise is minimal, a very small signal may be measured or otherwise detected and used. Furthermore, if the magnitude of the signal to be used by the servosystem is very small, then the deflection of the gauge diaphragm required to produce that signal is correspondingly small. A small deflection lends itself to a better response times and less diaphragm fatigue. The output of filter 56 is coupled to the input of AC amplifier 50. The gain of amplifier 50 is preferably very high, such as one million. The amplifier gain is then effectively the limit upon the system resolution. The control signal used to produce a restoring force current in the diaphragm is therefore very large for a very small diaphragm deflection. Thus, the diaphragm may be continually maintained very near its null position. Since there must always be some diaphragm deflection to produce the first signal or bridge output there is inherently an error between the indicated pressure as electrically indicated and the actual fluid pressure. However, with a gain of one million, there is only an error of one part in a million.

The amplifier output is coupled to the input of detector 51. Detector 51 operates upon the first signal to produce two DC (direct current) output voltages. One output 57 is directly proportional to the amplitude of the amplified AC bridge output signal. This voltage generator or current source 54 is coupled to the gauge diaphragm and is variable in magnitude by changes in the bridge output as described above. The other detector output 58 is coupled to oscillator 49. Oscillator 49 impresses an AC wave upon the bridge circuit. Output 58 is representative of the phase difference between the oscillator output 59 and the amplified bridge output. In this manner, the oscillator frequency may be varied to produce a bridge output signal at a frequency which will be most efficiently transmitted by filter 56. Thus a phase-lock loop is provided. This assures operation of the oscillator at the frequency where the amplifier gain and signal to noise ratio are maximum.

A DC power amplifier 52 is provided for the purpose of matching the power level of the first signal or pressure error signal to auxillary equipment such as visual display devices or chart recorders 53.

The restoring pressure is applied to pressure diaphragm 10 by DC current from power supply 54 which is in turn controlled by an amplified output from error amplifier 52. A decade type unit 55 is useful as a means for setting a zero output reading when there is no applied fluid pressure. It is also useful as a means for applying a constant current to pressure diaphragm 10. In this manner, the current producing the electromagnetic diaphragm pressure may be displayed on a digital or analog device minus a fixed pressure. Thus, deviations in pressure about a nominal operating pressure other than zero may be sensed with high accuracy.

Figure 4:
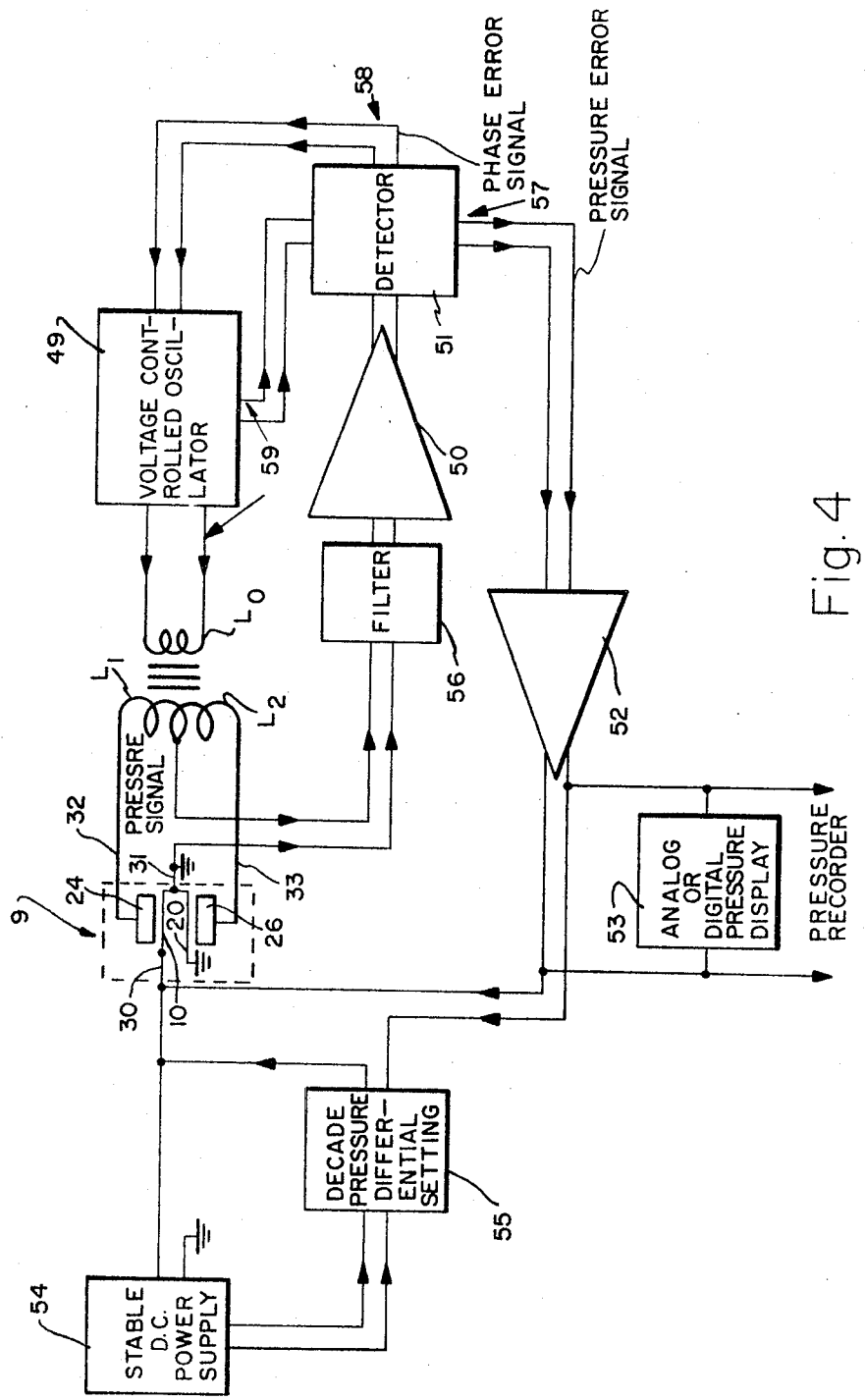
FIG. 4 is a schematic of a servosystem circuit in accordance with the principles of the present invention and in which the instrument of FIG. 2 and 3 may be used.

It is noted that while a pressure diaphragm DC current supply 54 is shown in FIG. 4, an AC current may be used to control the diaphragm magnetic pressure. In the latter case, the magnetic field must be generated by an AC electromagnet from the same power supply. In this manner, the direction of current and magnetic flux reverse simultaneously and the resultant force on the diaphragm remains unidirectional. However, the AC field frequencies must be above the mechanical resonant frequency of the pressure diaphragm in order to avoid induced vibration.

The differential pressure sensing instrument as has been described in particularly useful when the fluid pressure is very low or near vacuum. The aperture 4 in housing flange 2 may be as large as or larger than the working or unclamped portion 11 of diaphragm 10. Existing diaphragm type differential pressure meters do not provide an open exposure of the diaphragm. The larger aperture 4 provides for a relative high molecular conductance, therefore, maximum response speed. Flange 2 may be mounted directly in or on the wall of a pressure chamber.

The gauge of the type described may also be used for the measurement of pressure exceeding one atmosphere. A very thin diaphragm is desirable for small applied differential pressures, but may not be able to carry sufficient current per unit width to accommodate an adequate restoring force. For large differential pressure, a thicker diaphragm may be used.

The large aperture 4 provides the further advantage of direct measurement of diaphragm deflection. Supplementary measurements may be made by optical means, infrared, or microwave interferometers.

The materials used in constructing an instrument as discussed herein may be selected to meet the conditions of the particular working fluids, such as corrosiveness. The pertinent equations for a typical instrument will now be considered.

The magnetic force density at a point in a solid current conductor is given by $F_m = J \times B$ where $F_m$ is in Newtons/cubic meter; $J$ is the current density in amperes/square meter; and $B$ is the magnetic flux density in Webers/square meter. Where there is only an $\times$ component of current and a y component of magnetic flux, there is only a z component of force. The magnetic pressure $P_m$ per unit area of diaphragm may be obtained by integration. Where $J \times B$, the diaphragm thickness $t$, length $l$, and width $w$ are constant, the magnetic pressure $P_m$ is constant and equal to $Jt \times B$.

Considering a current conducting diaphragm of .001 inch thick high magnetic permeativity, a 2.0 inch diameter unclamped surface area, a saturation inductance of 23,000 Gauss, $26 \times 10^{-6}$ ohm centimeter resistivity, 90,000 pounds/square inch ultimate strength, 55,000 p.s.i. yield strength, $35 \times 10^6$ p.s.i. modulus of elasticity, a relative permeability of $10^5$ at 19,000 Gauss, and $B$ equal to 2 Webers/square meter, the current requirements for magnetic restoring of the diaphragm to the null position may be determined. An applied fluid differential pressure of one atmosphere is $1.02 \times 10^5$ Newtons/square meter, thus $P_m$ must be equivalent thereto. Hence, $Jt = P_m/B = 1.02 \times 10^5/2.0 = 5.1 \times 10^4$ amperes/meter/atmosphere $= 1.29 \times 10^3$ amperes/inch width/atmosphere $= 1.708$ amperes/inch width/millimeter of Mercury. The restoring current may be readily supplied for practical diaphragm widths.

An analysis of Joule heating effects for the foregoing current diaphragm yields 14.9 milliwatts/square inch of Joule heating which can be readily dissipated by radiation and conduction without excessive temperature rise.

Figure 5:
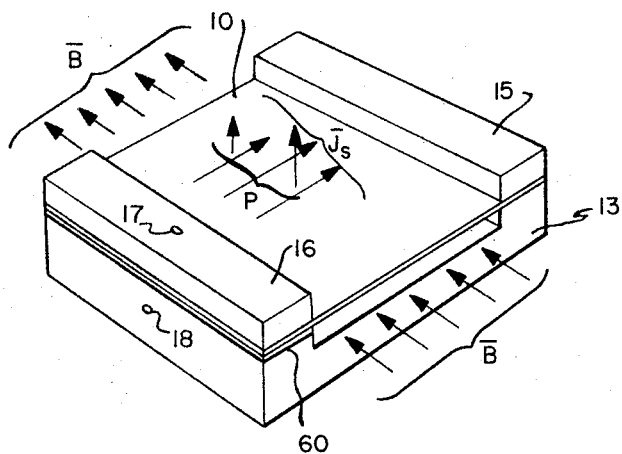
FIG. 5 is a further example of a pressure sensing instrument which may be used in conjunction with this invention.

An alternative embodiment of a diaphragm assembly is shown in FIG. 5. Again, diaphragm 10 is clamped along opposing edge portions. Lower clamping block 13 is generally U-shaped and is of current conducting material. Clamping of diaphragm is completed by conducting bar 15, 16. Diaphragm 10 and lower block 13 are separated by an insulating sheet 60. Current connections are made at 17 and 18. Current flows from 17 into bar 16, through diaphragm 10, through lower block 13, and the circuit is completed externally through connection 18. The current flowing through diaphragm 10 induces a magnetic field thereabout which interacts and reinforces a magnetic field induced about block 13. Current in diaphragm 10 therefore cuts transversely through the induced magnetic field. A resultant force is imposed on diaphragm 10. This is the same force found in a motor or generator.

The force on the diaphragm is normal thereto and constant in portions within the diaphragm that are removed from the edges of the diaphragm. The outer portions of the diaphragm may be clamped similar to the assembly of FIG. 1. Without the large external magnetic field, the control pressure will be proportional to the square of the control current. The control sensitivity will therefore be less than the embodiment of FIG. 1.

A differential pressure sensing instrument and electric servosystem as disclosed herein will have the ability to measure pressures in the magnitude of $10^{-10}$ to $^{-12}$ millimeters of Mercury. Extraneous effects of external noise, external vibration, change in gas species, sorption, permeation and temperature are automatically cancelled. There is relatively high attenuation and damping of extraneous vibration by the magnetic field and by the negative feedback. There is direct access to the sensing diaphragm enabling direct diaphragm deflection measurements. The direct access also provides high vacuum conductance for maximum response when working at vacuum pressures. And, finally, the instrument is capable of direct pressure calibration from current.

I claim:

1. A servocircuit for use with a null balance type of measuring instrument wherein a sensing member is displaced in response to forces to be measured and wherein the sensing member is restorable to the null position by restoring means in response to an external restoring signal, comprising:
   a. a bridge network position sensing means coupled to the sensing member for producing a deviation signal representative of the displacement of the sensing member;
   b. an amplifier having an output coupled to the instrument to produce a restoring force signal, said amplifier being characterized by a gain of sufficient magnitude such that the resolution of the servosystem is limited by the gain;
   c. a narrow band filter coupled between said position sensing means and said amplifier for passing a narrow band of selected frequencies of the deviation signal to said amplifier;
   d. a detector coupled to an output of said amplifier for producing an output signal representative of a phase difference and having a second output comprising a direct current voltage directly proportional to the amplifier output signal and coupled to the instrument for providing a controllable varying restoring signal; and
   e. a voltage control oscillator having an output signal of said detector coupled thereto, and having an output thereof coupled to a second detector input for comparing the relative phase of the oscillator output with said amplifier output signal, said voltage controlled oscillator having a variable phase output coupled to said bridge network sensing means thereby providing a deviation signal at a frequency within the frequencies passed by said narrow band filter.

2. The servocircuit of claim 1 further including:
indicating means coupled between said detector and the instrument for visually displaying or recording a representation of the restoring signal.

* * * * *